Dec. 15, 1942. E. A. FORSBERG 2,305,469
DISK LINER FOR CENTRIFUGAL BOWLS
Filed May 3, 1941

WITNESS:
Rob R Kitchel

INVENTOR
Erik August Forsberg
BY
Busser and Harding
ATTORNEYS.

Patented Dec. 15, 1942

2,305,469

UNITED STATES PATENT OFFICE 2,305,469

DISK LINER FOR CENTRIFUGAL BOWLS

Erik August Forsberg, Nockeby, Sweden, assignor to The De Laval Separator Company, New York, N. Y., a corporation of New Jersey Application May 3, 1941, Serial No. 391,694
In Sweden June 3, 1940

12 Claims. (Cl. 233—41)

It is customary, in the manufacture of centrifuges, intended for various uses, for example, for separating the cream and skim milk constituents of whole milk, for purifying milk, for separating and purifying various oils, and for other industrial uses involving the separation of liquids or the separation of solids from liquids, to provide the centrifuge with a lamella or lamine "liner" by which the separating chamber is divided into a multiplicity of sub-chambers of small radial extension in order to shorten the path of travel of the separated constituents in the mixture undergoing separation and to facilitate their discharge from the separating chamber. The "liner" usually consists of a pile of superposed spaced apart cone-shaped "disks," although other forms or shapes are known, as, for example, revolution bodies with curved generatrix. An example of the last named type is found in the Ljungström Patent No. 892,999, in which the conical shape is modified by giving such a curved form to the generatrix that the angle between the radius and the generatrix increases with increasing radius, the disk thereby becoming vaulted or of dome or cupola shape. A disk of this shape theoretically affords certain advantages over the ordinary conical shape, but in practice it has not been possible to utilize these advantages, because, in the arrangements heretofore utilized, if the curvature is pronounced, the progressive reduction in the space between adjacent disks from center to periphery, is impractically excessive; that is, if an ordinarily set of truly conical disks of normal dimensions be compared with a set of cupola-shaped disks, both having the same number of disks and the same principal dimensions, the distance between adjacent disks of the second named set near their outer edges becomes so small as to effect clogging. While this can be avoided by decreasing the number of disks, such decrease would involve a partial sacrifice of the advantage of the multiple disk type of machine, so that more would be lost than gained by giving the disks the described curved shape.

My invention comprises disks having the described curved shape, or a less desirable but practicable bent shape, wherein all the advantages of such a shape are secured with avoidance of the danger of clogging at and near their outer edges and without the necessity of reducing their number.

Figure 1:
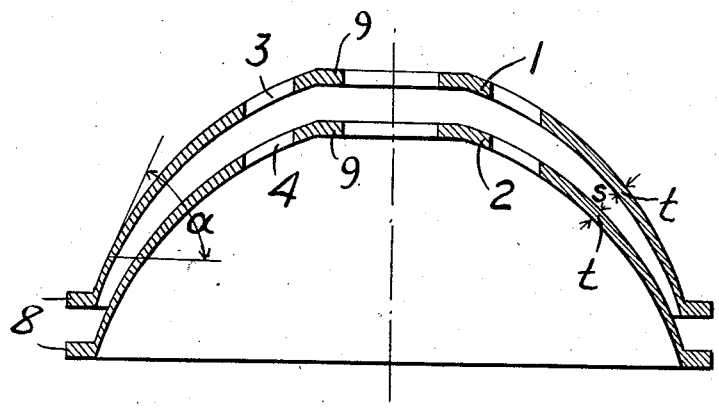
Figure 2:
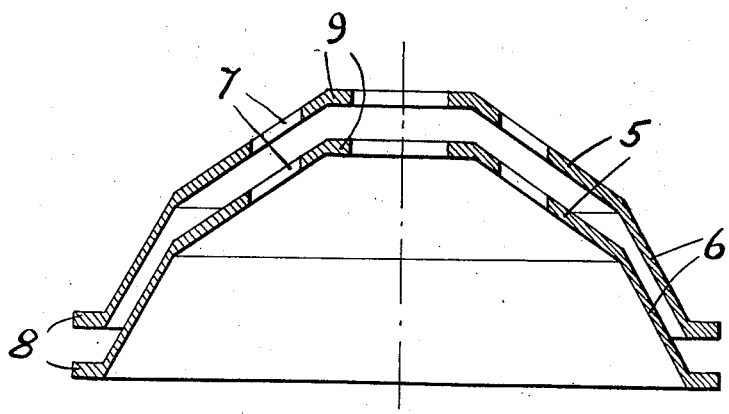

To illustrate my invention I show two embodiments of my invention, each of Figs. 1 and 2 being a vertical section through two adjacent disks.

To simplify the disclosure, only two disks are shown in each figure, but of course it will be understood that a large number of superposed disks will ordinarily be utilized, it being practicable to utilize substantially the same number of disks as in centrifuges provided with cone-shaped disks; and the curved shape may characterize the customary top and bottom discs. The bowl may be of any usual shape and the inlet and outlet or outlets of the bowl may be of any usual or convenient arrangement. It is especially advantageous, however, as will hereinafter be explained, to utilize disks provided with vertically aligned holes in the disks of the piles through which the mixture to be separated is supplied to and distributed throughout the interspaces between the disks; and to discharge the heavier separated constituent over the usual top disc and with the usual means for regulating the densities or relative quantities of the separated constituents at the outlet for either the light or heavy constituent.

Fig. 1 illustrates an embodiment of my invention that has been found very efficient in practice. The generatrix of each disk 1 and 2 is a continuous curve, the inside of the curve being concave and the outside convex. An essential feature of such a disk is that the thickness of the disk should be reduced from center toward periphery. Preferably the reduction in thickness is continuously progressive and uniform. The disks are preferably provided with the distributing holes, hereinbefore described, which are preferably located nearer to the center than to the periphery, each hole being thus located in a part of the disc which is of greater than average thickness. If the vertical distance between the upper surfaces of adjacent disks is $b$ and the thickness of the disks is $t$ at a place where the inclination towards the radius is $a$, the perpendicular distance between the disks evidently must be $s = b \cos a - t$. The thickness $t$ may decrease according to any arbitrary law. If the special spinning method described in the Lindgren Patent No. 1,939,356 is used in the manufacture, $t = d \cos a$, $d$ being the original thickness of the material.

The importance of decrease in the thickness $t$ is illustrated by the following example. Assume $b = 2$ mm. and thickness $d = 1$ mm. As $$s = 2 \cos a - 1$$

it is found that when $a = 60°$ $s = 0$. In order to avoid clogging, $s$ must have a certain minimum value, approximately 0.3 mm. It is found that this value is attained at $a =$ about 49°, which in reality enables but a slight, if any, curvature. If $t$ had been less, for instance 0.64, $s$ would be $= 0.36$ mm. at $a = 60°$, that is close to the limit of useability. The limit $s=0.3$ mm. is reached at $a=$ about 62°.

Assume, on the other hand, according to the invention that $t$ is variable. According to the law $t=d \cos a$, it follows that—

$$s=(b-d) \cos a=(2-1) \cos a=\cos a$$

With $a=60°$, $s$ is still $=0.5$. $a$ may be increased to arc cos $0.3=72.5°$ before $s$ becomes too little.

The examples cited show that if a more considerable curvature is to be obtained, the thickness of the disk at the outer edge must have a comparatively low value.

It could be alleged that at least as good a result would be obtained if the disk were of even although slight thickness throughout. This may be true as long as only the separating ability is taken into account, but a disk of this kind would be too weak to withstand the stresses and wear which occur in practice. This defect becomes especially marked if the disk is provided with inlet openings 3 and 4, which is a practically necessary feature of modern liners. In order to prevent deformation of the areas between and closest to the holes, the material must be thicker here than is necessary farther out where the disks are imperforate.

Fig. 2 shows another embodiment which is somewhat less efficient but perhaps simpler to manufacture. The curvature is not a continuous one, but the mantle of the disk is divided into two or more parts, the central part or parts being of greater thickness and of flatter conacity than the outer part or parts. Assuming two such parts, the central part is relatively thick and is of frusto-conical shape having a relatively wide angle to the axis of the bowl, while the outer part is relatively thin and is of a frusto-conical shape having a relatively steep angle to the axis of the bowl. A curved generatrix may also be given to one or more of the said parts, although this hardly entails any advantages from a practical point of view.

In all embodiments it is advantageous to provide the disk in known manner with plane or conical reinforcement flanges 8 and 9, preferably thicker than the mantle of the disk. For purposes of clearness, the usual calks for spacing the disks apart are not shown.

What I claim and desire to protect by Letters Patent is:

1. A liner for centrifugal bowls comprising disks between which the main separation is effected and from the spaces between which the lighter constituent is discharged at their inner ends and the heavier constituents at their peripheries, said disks being of rotational symmetry wherein the angle which the generatrix of the disks makes with the radius is greater in the outer part than in the inner part of the disks and wherein the thickness of the outer parts of the disks is less than that of the inner parts of the disks.

2. A liner for centrifugal bowls as defined in claim 1 in which said angle progressively, and substantially continuously, increases from the inner to the outer marginal parts of the disks and in which the thickness of the disks progressively, and substantially continuously, decreases as the radius increases.

3. A liner for centrifugal bowls comprising disks of rotational symmetry wherein the angle which the generatrix of the disks makes with the radius is greater in the outer part than in the inner part of the disks and wherein the thickness of the outer parts of the disks is less than that of the inner parts of the disks and in which the mantle of the disk is divided into a plurality of frusto-conical sections which as their distances from the axis increase progressively decrease in thickness and increase in angularity to the radius of the bowl.

4. A liner for centrifugal bowls comprising disks of rotational symmetry wherein the angle which the generatrix of the disks makes with the radius is greater in the outer part than in the inner part of the disks and wherein the thickness of the outer parts of the disks is less than that of the inner parts of the disks and in which the disks are provided with mixture receiving and distributing holes formed in relatively thick parts thereof.

5. A liner for centrifugal bowls comprising disks of rotational symmetry wherein the angle which the generatrix of the disks makes with the radius is greater in the outer part than in the inner part of the disks and wherein the thickness of the outer parts of the disks is less than that of the inner parts of the disks, the disks being provided with reinforcing flanges of a thickness not less than the maximum thickness of the disks.

6. A liner for centrifugal bowls comprising disks of rotational symmetry wherein the angle which the generatrix of the disks makes with the radius is greater in the outer part than in the inner part of the disks and wherein the thickness of the disks is at every point substantially proportional to the cosine of the angle between the generatrix and the radius, the mantle of the disk being divided into a plurality of frusto-conical sections which as their distances from the axis increase progressively decrease in thickness and increase in angularity to the radius of the bowl.

7. A liner for centrifugal bowls comprising disks of rotational symmetry wherein the angle which the generatrix of the disks makes with the radius is greater in the outer part than in the inner part of the disks and wherein the thickness of the disks is at every point substantially proportional to the cosine of the angle between the generatrix and the radius, the disks being provided with mixture-receiving and distributing holes formed in relatively thick parts thereof.

8. A liner for centrifugal bowls comprising disks of rotational symmetry wherein the angle which the generatrix of the disks makes with the radius is greater in the outer part than in the inner part of the disks and wherein the thickness of the disks is at every point substantially proportional to the cosine of the angle between the generatrix and the radius, and reinforcing flanges on the disks, said flanges being of a thickness not less than the maximum thickness of the disks.

9. A liner for centrifugal bowls comprising a plurality of disks of similar size and shape superposed one upon another and forming between them separating spaces from the inner ends of which the lighter separated constituent is discharged and from the outer ends of which the heavier separated constituent is discharged, said disks being of cupola-shape and of progressively decreasing thickness from their inner marginal portions to their outer marginal portions.

10. A liner for centrifugal bowls comprising a plurality of disks all of similar size and shape superposed one upon another and forming between them separating spaces from the inner ends of which the lighter separated constituent is discharged and from the outer ends of which the heavier separated constituent is discharged, said disks having a curved contour whose thickness progressively decreases and whose angle of curvature relative to the radius of the bowl progressively increases from the marginal portions thereof nearest the bowl's axis to their peripheral marginal portions.

11. A liner for centrifugal bowls comprising a a plurality of disks of similar size and shape superposed one upon another and forming between them separating spaces from the inner ends of which the lighter separated constituent is discharged from the outer ends of which the heavier separated constituent is discharged, said disks being of rotational symmetry wherein the angle which the generatrix of the disks makes with the radius is greater in the outer part than in the inner part of the disks and wherein the thickness of the disks is at every point substantially proportional to the cosine of the angle between the generatrix and the radius.

12. A liner for centrifugal bowls comprising a plurality of disks of similar size and shape superposed one upon another and forming between them separating spaces from the inner ends of which the lighter separated constituent is discharged and from the outer ends of which the heavier separated constituent is discharged, said disks being of rotational symmetry wherein the angle which the generatrix of the disks makes with the radius is greater in the outer part than in the inner part of the disks and in which said angle progressively and substantially continuously increases from the inner to the outer marginal portions of the disk and in which the thickness of the disks is at every point substantially proportional to the cosine of the angle between the generatrix and the radius.

ERIK AUGUST FORSBERG.